United States Patent Office 3,370,069
Patented Feb. 20, 1968

3,370,069
2,5-DIACYLAMINO-3,6-DIAMINO-1,4-BENZOQUINONES
Erhardt Winkelmann and Wolf-Helmut Wagner, Frankfurt am Main, Germany, assignors to Farbwerke Hoechst Aktiengesellschaft vormals Meister Lucius & Brüning, Frankfurt am Main, Germany, a corporation of Germany
No Drawing. Filed July 25, 1963, Ser. No. 297,680
Claims priority, application Germany, Aug. 1, 1962, F 37,476
4 Claims. (Cl. 260—396)

ABSTRACT OF THE DISCLOSURE 3,6-diamino-1,4-benzoquinones in which the 2- and 5-positions are occupied by propionylamino-, valeroylamino-, hexahydro-benzoylamino- and crotonylamino-groups, said compounds being active against coccidiosis.

The present invention relates to 2,5-diacylamino-3,6-diamino-1,4-benzoquinones and to a process for their manufacture. The invention further relates to animal food or preparations containing the above-mentioned quinones as active substance against coccidiosis and to a process for the treatment of coccidiosis by applying said quinones.

We have found that 2,5-diacyl-amino-3,6-diamino-1,4-benzoquinones of the general formula

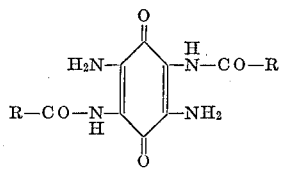

wherein R represents a saturated or unsaturated alkyl radical having from 1 to 5 carbon atoms or a cycloalkyl radical having from 5 to 6 carbon atoms, are obtained in high purity and with good yields by reacting 2,5-diacyl-amino-3,6-dihalogen-1,4-benzoquinones of the formula

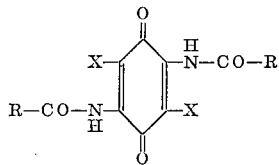

wherein R has the meaning given above and X represents a halogen atom, with dry ammonia in a solvent or diluent.

In the 2,5-diacylamino-3,6-dihalogen-1,4-benzoquinones of the above-mentioned formula used as starting substances for the process according to the invention the substituent R may stand, for instance, for methyl, ethyl, propyl, isopropyl, butyl, isobutyl, amyl, isoamyl, vinyl, propene-1-yl, isopropene-1-yl, butene-1-yl, isobutene-1-yl, cyclopentyl or cyclohexyl. As halogens there are preferably used fluorine, chlorine and bromine.

These starting substances are advantageously obtained by converting, for instance, a 2,3,5,6-tetrahalogen-1,4-benzoquinone such as chloranil or bromanil with ammonia into a 2,5-diamino-3,6-dihalogen-1,4-benzoquinone and acylating the amino group according to known methods, for example, by reaction with corresponding carboxylic acid anhydrides. For the reaction there may be used, for instance, the anhydrides of acetic acid, propionic acid, butyric acid, isobutyric acid, valeric acid, isovaleric acid, caproic acid, acrylic acid, crotonic acid, 1-methacrylic acid, 2,2-dimethyl-acrylic acid or cyclopentane- and cyclohexane-carboxylic acids.

The process of the invention is suitably carried out by dissolving or suspending at first one reactant, i.e., the 2,5-diacylamino-3,6-dihalogen-1,4-benzoquinone in an appropriate, preferably a polar, anhydrous liquid reaction medium. It is of advantage to apply an organic liquid as solvent or distributor in 10 to 100 times the weight of the benzoquinone. As solvents may be used, for instance, alcohols, especially propanol, isopropanol, butanol, isobutanol, amyl alcohol, isoamyl alcohol, cyclopentanol, cyclohexanol, benzyl alcohol, ethers such as ethyleneglycol-monoalkyl ethers, particularly ethylene-glycol-monomethyl-ether and ethylene-glycol-monoethyl-ether, cyclic ethers such as tetrahydrofurane and dioxane, aliphatic-aromatic ethers such as anisol, nitriles, for instance, acetonitrile, propionitrile, butyronitrile, nitro-compounds of the type of nitro-benzene and amides such as formamide, N-alkyl- and N,N-dialkyl-formamides, especially N,N-dimethyl- and N,N-diethyl-formamide or acetamide and N-alkyl-acetamides, particularly N-methyl- and N-ethyl-acetamide or the corresponding dialkyl-amides.

The reaction with ammonia can be carried out by introducing it at an appropriate temperature into the solution or suspension. It is, however, likewise possible to introduce a 2,5-diacylamino-3,6-dihalogen-1,4-benzoquinone into the solvent or distributor liquid saturated with ammonia, and then to heat the substance to an appropriate temperature. It is of advantage to dry the ammonia in the usual manner, for instance by conducting it over solid alkali metal hydroxide prior to its being applied or prior to its action. The reaction temperature generally amounts to 80–200° C.; it is useful to operate at 120–160° C. If the boiling point of the solvent or distributor liquid used is below this temperature range, the reaction is carried out in a closed system (sealed tube or autoclave). If the reaction is realized in solvents showing a high dissolving power for the starting substances, for instance, in dimethyl-formamide, the reaction according to the invention takes place with sufficient velocity already at room temperature. It is, however, more useful to apply an elevated temperature likewise in said case.

The reaction periods vary between a few minutes and several hours, according to the conditions and temperatures applied in each case.

In general, the products obtained according to the process of the invention crystallize out immediately or on cooling the reaction mixture and can be isolated in the usual manner by suction-filtering. If desired, they can be purified by recrystallization from appropriate solvents, such as nitrobenzene.

The new products of the invention can be used as medicaments. They are particularly suitable for the therapy and prophylaxis of poultry coccidiosis. For instance, an addition of 0.025% of 2,5-dipropionyl-amino-3,6-diaminobenzoquinone-1,4 to the food inhibits the disease from breaking out even in the case of a strong infection with 120,000 oocysts (*Eimeria tenella*) per chicken.

For the prophylaxis and therapy of coccidiosis it is suitable to extend the substances advantageously with a carrier, particularly with a finely divided solid, inert and well tolerable mass in which they are homogeneously distributed, most favorably by means of an appropriate mixing device. The active substances are preferably admixed with the food with which they are then taken up by the animals. In order to attain a satisfying and uniform distribution it is useful to prepare at first a preliminary mixture in which the active substances are highly concentrated. In practice, concentrations of 10 to 50%, preferably of about 25%, enter into consideration. Inorganic or organic substances may be used as carriers. There may be used, for example, calcium carbonate, flour of various types of grain or dry mycelium of the fermentation of antibiotics. It is of advantage to use wheat middlings for the purpose in question. Other substances important in animal nutrition, for instance antibiotics or vitamins, may be added to the preliminary mixtures. A corresponding amount of such a preliminary mixture is then thoroughly mixed with the chicken or hen food so that a uniform distribution is ensured. The food mixture is suitably adjusted to a content of active substance of 0.001 to 0.1% and given to the animals. As example for an appropriate mixture a feedstuff of the following composition is mentioned:

| | Kgs. |
|---|---|
| White-fish meal | 3.500 |
| Soya meal | 9.000 |
| Barley coarse meal | 2.500 |
| Mais coarse meal | 20.750 |
| Wheat coarse meal | 10.000 |
| Wheat bran | 2.500 |
| Calcium phosphate | 0.500 |
| Calcium carbonate | 0.500 |
| Mixture of vitamins and mineral salts | 0.750 | admixed with 15 grams of 2,5-dipropionylamino-3,6-diamino-benzoquinone.

The test described in the following demonstrates the excellent therapeutical efficiency of the 2,5-di-(propionylamino)-3,6-diamino-1,4-benzoquinone:

10 chickens, one or a few days old (White Leghorn), are infected with 60,000 spored oocysts of *Eimeria tenella* by means of the esophageal sound. The therapeutical treatment is started one day after infection and continued until the 9th day (once on successive days). An equal group of animals infected but not treated serves as control. The single dose/animal amounts to 0.03 gram/day and is given by means of the esophageal sound. Whereas all control animals die within the test period, all treated animals survive and show an average increase in weight of 52 grams. The autopsy of all treated animals at the end of the test shows that practically no oocysts are found in the cecum.

The following examples serve to illustrate the invention but they are not intended to limit it thereto:

*Example 1.—2,5-diacetylamino-3,6-diamino-1,4-benzoquinone*

5 grams of 2,5-diacetylamino-3,6-dichloro-1,4-benzoquinone are dissolved by heating in 500 cc. of normal butanol. At about 120° C. dry gaseous ammonia is introduced for about 1 hour in a moderate stream. In most cases, the desired product separates already after a few minutes in crystalline form. It is allowed to cool, and the remaining ammonia is eliminated by introducing nitrogen. The reaction product is filtered off with suction, freed from precipitated ammonium salts by treatment with water, washed with alcohol and ether or acetone and dried.

3.4 grams (78% of the theory) of 2,5-diacetylamino-3,6-diamino-1,4-benzoquinone are obtained in the form of dark brown crystals showing a violet surface gloss.

The compound is practically free from chlorine and does not show a characteristic melting point.

$C_{10}H_{12}N_4O_4$ (molecular weight 252). Calculated: 47.6% C, 4.8% H, 22.2% N. Found: 47.3% C, 4.8% H, 21.8% N.

2,5-diacetylamino-3,6-diamino-1,4-benzoquinone is obtained in the same way, for instance, by using the following reaction mediums and temperatures:

| Reaction medium | Temperature of the reaction mixture (° C.) | Yield in percent of the theoretical yield |
|---|---|---|
| Benzyl alcohol | 130 | 72 |
| Glycol-monomethyl ether | 125 | 65 |
| Dioxane | 100 | 80 |
| Acetonitrile | 80 | 72 |
| Nitrobenzene | 150 | 90 |

The 2,5-diacetylamino-3,6-dichloro-1,4-benzoquinone used as starting substance is prepared in the usual manner from 2,5-diamino-3,6-dichloro-1,4-benzoquinone by reaction with propionic acid anhydride.

*Example 2.—2,5-dipropionylamino-3,6-diamino-1,4-benzoquinone*

5 grams of 2,5-dipropionylamino-3,6-dichloro-1,4-benzoquinone are dissolved by heating the compound in 250 cc. of nitrobenzene. Dry gaseous ammonia is introduced for 1 hour at 150° C. in a moderate stream into this solution. After a few minutes the above-mentioned aminoquinone separates in crystalline form and is isolated as described in Example 1 and, if desired, purified. 3.7 grams of 2,5-dipropionylamino-3,6-diamino-1,4-benzoquinone (84% of the theory) are obtained in the form of dark brown crystals. The compound is practically free from chlorine and does not show a characteristic melting point.

$C_{12}H_{16}N_4O_4$ (molecular weight 280). Calculated: 51.5% C, 6.0% H, 20.0% N. Found: 51.5% C, 6.0% H, 19.7% N.

The 2,5-dipropionylamino-3,6-dichloro-1,4-benzoquinone is produced in the usual manner from 2,5-diamino-3,6-dichloro-1,4-benzoquinone by reaction with propionic acid anhydride.

*Example 3.—2,5-di-n-valeroylamino-3,6-diamino-1,4-benzoquinone*

Dry gaseous ammonia is introduced at 125° C. in a thin stream for 1 hour into a solution of 5 grams of 2,5-di-n-valeroylamino-3,6-dichloro-1,4-benzoquinone in 40 cc. of dimethylformamide. The product of the invention is isolated and purified as described in Example 1. 3.2 grams (71% of the theory) of 2,5-di-n-valeroylamino-3,6-diamino-1,4-benzoquinone are obtained in the form of dark brown crystals with violet surface gloss. The compound is practically free from chlorine and does not show a characteristic melting point.

$C_{16}H_{24}N_4O_4$ (molecular weight 336). Calculated: 57.2% C, 7.2% H, 16.7% N. Found: 57.2% C, 7.2% H, 16.8% N.

The 2,5-di-n-valeroylamino-3,6-dichloro-1,4-benzoquinone used as starting substance is produced in the usual manner from 2,5-diamino-3,6-dichloro-1,4-benzoquinone by reaction with n-valeric acid anhydride.

*Example 4.—2,5-di-hexahydro-benzoylamino-3,6-diamino-1,4-benzoquinone*

2,5-di-hexahydro-benzoylamino-3,6-diamino-1,4-benzoquinone is obtained as described in Example 3 in the form of dark-brown crystals and with a yield of 75% of the theory from 2,5-dihexahydro-benzoylamino-3,6-dichloro-1,4-benzoquinone. The compound is practically free from chlorine and does not show a characteristic melting point.

$C_{20}H_{20}N_4O_4$ (molecular weight 382). Calculated: 62.8% C, 5.2% H, 14.7% N. Found: 62.6% C, 5.4% H, 14.5% N.

The 2,5-di-hexahydro-benzoylamino-3,6-dichloro-1,4-benzoquinone used as starting substance is obtained in the usual manner from 2,5-diamino-3,6-dichloro-1,4-benzoquinone by reaction with hexahydro-benzoic acid anhydride.

Example 5.—2,5-di-crotonylamino-3,6-diamino-1,4-benzoquinone

As described in Example 3, 2,5-di-crotonylamino-3,6-diamino-1,4-benzoquinone is obtained from 2,5-di-crotonylamino-3,6-dichloro-1,4-benzoquinone in a yield of 64% of the theory in the form of dark-brown crystals. The compound is practically free from chlorine and does not show a characteristic melting point.

$C_{14}H_{16}N_4O_4$ (molecular weight 304). Calculated: 55.0% C, 5.3% H, 18.4% N. Found: 54.8% C, 5.4% H, 18.5% N.

The 2,5-di-crotonylamino - 3,6 - dichloro-1,4-benzoquinone used as starting substance is obtained in the usual manner from 2,5-diamino-3,6-dichloro-1,4-benzoquinone by reaction with crotonic acid anhydride.

We claim:
1. 2,5-dipropionylamino-3,6-diamino-1,4-benzoquinone.
2. 2,5-divaleroylamino-3,6-diamino-1,4-benzoquinone.
3. 2,5 - dihexahydro-benzoylamino - 3,6 - diamino-1,4-benzoquinone.
4. 2,5-dicrotonylamino-3,6-diamino-1,4-benzoquinone.

References Cited

UNITED STATES PATENTS

| | | | |
|---|---|---|---|
| 2,727,904 | 12/1955 | Ochwat | 260—396 |
| 2,715,636 | 8/1955 | Carson | 260—396 |
| 2,965,488 | 12/1960 | Belasco | 99—2 |
| 2,958,600 | 11/1960 | Thurman | 99—2 |
| 3,065,133 | 11/1962 | Tchelitcheff | 167—53 |
| 3,085,937 | 4/1963 | Hirayama | 167—53 |
| 2,802,001 | 8/1957 | Marxer | 167—55 |
| 3,040,030 | 6/1962 | Marxer | 260—396 |
| 3,060,188 | 10/1962 | Marxer | 260—396 |

OTHER REFERENCES

Wallenfels, Tetrahedron Letters, 1959, 24–5.

LORRAINE A. WEINBERGER, *Primary Examiner.*

LEON ZITVER, *Examiner.*

D. P. CLARKE, L. THAXTON, *Assistant Examiners.*